(12) United States Patent
Donaldson et al.

(10) Patent No.: US 7,334,341 B2
(45) Date of Patent: Feb. 26, 2008

(54) MEASUREMENT DEVICE

(75) Inventors: Teresa K. Donaldson, Huntersville, NC (US); John Abbott, Charlotte, NC (US); Scott Hall, Charlotte, NC (US); Darryl Baucom, Charlotte, NC (US)

(73) Assignee: Electric Power Research Institute, Palo Alto, CA (US)

( * ) Notice: Subject to any disclaimer, the term of this patent is extended or adjusted under 35 U.S.C. 154(b) by 0 days.

(21) Appl. No.: 11/189,386

(22) Filed: Jul. 26, 2005

(65) Prior Publication Data

US 2006/0042104 A1    Mar. 2, 2006

Related U.S. Application Data

(60) Provisional application No. 60/591,232, filed on Jul. 26, 2004.

(51) Int. Cl.
*G01C 15/00* (2006.01)
(52) U.S. Cl. .......................................... 33/286; 33/529
(58) Field of Classification Search ................. 33/286, 33/412, 529, DIG. 1
See application file for complete search history.

(56) References Cited

U.S. PATENT DOCUMENTS

| | | | |
|---|---|---|---|
| 2,169,533 A * | 8/1939 | Kasten | 33/412 |
| 2,763,932 A * | 9/1956 | McMillan | 33/DIG. 1 |
| 3,944,963 A | 3/1976 | Hively | |
| 4,049,954 A | 9/1977 | Da Costa Vieira | |
| 4,070,762 A | 1/1978 | Siddall | |
| 4,170,142 A | 10/1979 | Posakony et al. | |
| 4,195,530 A | 4/1980 | Ross et al. | |
| 4,203,069 A | 5/1980 | Davis | |
| 4,210,028 A | 7/1980 | Hildebrand | |
| 4,248,092 A | 2/1981 | Vasile et al. | |
| 4,290,308 A | 9/1981 | Dau | |
| 4,303,885 A | 12/1981 | Davis et al. | |
| 4,305,661 A | 12/1981 | Pryor et al. | |
| 4,307,612 A | 12/1981 | Elsley et al. | |
| 4,320,661 A | 3/1982 | Peterson et al. | |
| 4,391,532 A | 7/1983 | Hara | |
| 4,393,711 A | 7/1983 | Lapides | |
| 4,403,860 A | 9/1983 | Pryor | |
| 4,428,237 A | 1/1984 | Zeger et al. | |
| 4,432,931 A | 2/1984 | Lockett | |
| 4,526,037 A | 7/1985 | Wentzell | |
| 4,546,314 A | 10/1985 | Minerbo et al. | |
| 4,546,315 A | 10/1985 | Minerbo et al. | |
| 4,744,661 A | 5/1988 | Ulbers et al. | |
| 4,982,158 A | 1/1991 | Nakata et al. | |
| 5,023,549 A | 6/1991 | Dau et al. | |
| 5,237,874 A | 8/1993 | Latimer et al. | |

(Continued)

*Primary Examiner*—Christopher W Fulton
(74) *Attorney, Agent, or Firm*—Curatolo Sidoti Co., LPA

(57) ABSTRACT

A measurement device provides coordinates for a specified location and position on the exterior surface of a vessel, including a base adapted to contact the exterior surface of the vessel; a rail extending upwardly from the base, the rail including a measurement scale; a head slidably supported by the rail; the head including a clamping mechanism used to releasably secure the head to the rail; and a laser carried by the head for projecting an image on the exterior surface of the vessel. The device quickly measures both the radial position and the angular position of an indicated location relative to the axis of the nozzle, and the skew of a transducer probe which provided the indicated location.

20 Claims, 8 Drawing Sheets

U.S. PATENT DOCUMENTS

| | | |
|---|---|---|
| 5,608,691 A | 3/1997 | MacLauchlan et al. |
| 5,698,787 A | 12/1997 | Parzuchowski et al. |
| 5,705,741 A | 1/1998 | Eaton et al. |
| 5,717,169 A | 2/1998 | Liang et al. |
| 5,734,588 A | 3/1998 | Rose et al. |
| 5,825,017 A | 10/1998 | Pryor |
| 5,837,898 A | 11/1998 | MacLauchlan |
| 6,052,911 A * | 4/2000 | Davis .......................... 33/286 |
| 6,070,467 A | 6/2000 | Rosenberg et al. |
| 6,082,198 A | 7/2000 | Sabourin et al. |
| 6,109,108 A | 8/2000 | Ohtani et al. |
| 6,176,132 B1 | 1/2001 | MacLauchlan |
| 6,188,643 B1 | 2/2001 | Liang et al. |
| 6,215,836 B1 | 4/2001 | Walker et al. |
| 6,282,964 B1 | 9/2001 | Hancock et al. |
| 6,360,446 B1 * | 3/2002 | Bijawat et al. ................ 33/286 |
| 6,449,326 B1 | 9/2002 | Walker et al. |
| 6,578,424 B1 | 6/2003 | Ziola et al. |
| 6,581,294 B2 * | 6/2003 | Svaldi .......................... 33/286 |
| 6,666,095 B2 | 12/2003 | Thomas et al. |
| 6,736,011 B2 | 5/2004 | Zayicek et al. |
| 2004/0040166 A1 | 3/2004 | Raab et al. |

\* cited by examiner

MEASUREMENT DEVICE

This application claims the benefit of the filing date of U.S. Provisional Application for Patent Ser. No. 60/591,232 filed Jul. 26, 2004.

FIELD OF INVENTION

The disclosed device is generally related to a device configured to provide the position of a flaw indication on the exterior of a nozzle, a pressure vessel, and/or a blend between the nozzle and pressure vessel. More particularly, the disclosed device is related to a device capable of providing the position of the traced outline of a transducer probe provided on the exterior of the nozzle, pressure vessel, and/or blend. More specifically, the disclosed device is related to a device having the capability of measuring both the radial position and the angular position of a traced outline relative to the axis of the nozzle, and the skew of the transducer probe which provided the traced outline.

BACKGROUND

To ensure the continued operational capability of the fluid containing vessels used in a nuclear power plant facility, the integrity of these vessels is periodically tested. Such vessels include a pressure vessel and a perpendicularly-oriented nozzle welded to the pressure vessel which communicates with the interior of the pressure vessel.

The Nuclear Regulatory Commission, under authority granted by the Congress of the United States, establishes rules and regulations for the operation of domestic nuclear facilities. These rules, and amendments to the rules, are publicized in the Federal Register under 10CFR50, Industry Codes and Standards. The Commission has established the American Society of Mechanical Engineers (ASME) Boiler & Pressure Vessel Code as the engineering authority for the design, construction, and operation of nuclear reactors. Section XI of the ASME Code (incorporated by reference herein as if fully written out below) contains the rules for in-service inspection of nuclear plant components as amended by 10CFR50.55a (Final Rule).

ASME Section XI, Article IWA-1320 (a) (1) states "the rules of IWB shall be applied to those systems whose components are classified ASME Class 1 (Quality Group A).

ASME Section XI, Subsection IWB provides the requirements for Class 1 components of light-water cooled plants and states in Article IWB-2000 that "Examinations required by this Article shall be completed prior to initial plant start-up"up". It states that the sequence of component examinations, which was established during the first inspection interval, shall be repeated during each successive inspection interval, to the extent practical. Components shall be examined and tested as specified in Table IWB-2500-1, which specifically defines examination category B-D, Full Penetration Welded Nozzles in Vessels. This category includes the "Nozzle Inside Radius Section". The examination method required is volumetric, which is either an ultrasonic technique or a radiographic technique. FIG. 1 areas "A" and "B" define the Nozzle Inside Radius Section or examination area, $t_s$ is vessel thickness, and $t_{n1}$ is nozzle boss thickness. The beam 112 of the transducer probe 111 is pointed in the direction of areas "A" and "B" which are situated between the nozzle 12 and pressure vessel 14. FIG. 1 also shows the weld 110 between the nozzle 12 and the pressure vessel 14.

ASME Section XI, Article IWA-2000, which stipulates requirements for Examination and Inspection, covers general requirements, examination methods, qualifications of nondestructive examination personnel, inspection program, extent of examination and weld reference system. Under IWA-2200 "Examination Methods" is sub article IWA-2230, Volumetric Examination and under that is IWB-2232, Ultrasonic Examination, which states that "Ultrasonic examination shall be conducted in accordance with Appendix 1.

ASME Section XI, Appendix 1, Article I-2000 stipulates what examination requirements are required for each type of component. The requirement for Vessels Greater than 2 in. (51 mm) in Thickness are found in I-2110(a) Ultrasonic examination procedures, equipment, and personnel used to detect and size flaws in reactor vessels greater than 2 in. (51 mm) in thickness shall be qualified by performance demonstration in accordance with Appendix VIII for the following specific examinations and no other I-2000 requirements apply.

(1) Shell and Head Welds Excluding Flange Welds
(2) Nozzle to Vessel Welds
(3) Nozzle Inside Radius Section
(4) Clad/Base Metal Interface Region ASME Section XI, Appendix VIII, Performance Demonstration for Ultrasonic Examination Systems, Article VIII-3000, Qualification Requirements, states that examination procedures, equipment and personnel are qualified for both detection and sizing flaws upon successful completion of the performance demonstration specified in the appropriate Supplement listed in Table VIII-3110-1, Supplement 5 being Nozzle Inside Radius Section.

In addition to the pressure vessel and nozzle themselves, an area of concern is the blend formed there between, i.e., the nozzle's inside radius section. The blend refers to the welded interface between the pressure vessel and nozzle. Because the pressure vessel and nozzle have cylindrical shapes, the shape of the blend is contingent on the relative diameters of the pressure vessel and nozzle. For example, if the pressure vessel has a significantly larger diameter than the nozzle, then the blend (for a vertically oriented pressure vessel) is slightly bowed between its vertical extremities. However, if the pressure vessel and nozzle have identical diameters then the blend (for a vertically oriented pressure vessel) is significantly bowed between its vertical extremities.

Because the pressure vessel normally has a significantly larger diameter than the nozzle, the shape of the blend associated therewith is only slightly bowed. Nevertheless, the blend has a complex three-dimensional geometry when compared to the pressure vessel and nozzle. To insure accurate testing of the fluid containing vessels, the exterior and interior dimensions of the nozzle, pressure vessel, and blend are recorded before the nuclear facility begins operation.

In putting together the Supplement 5, demonstration requirements, 10CFR50.55a allowed an alternative method to be used, Code Case N-552, "Qualification for Nozzle Inside Radius Section from the Outside Surface". With regard to flaws 113 this Code Case requires that a model be used to calculate the incident angle 114, misorientation angle 115, and the maximum metal path distance to the required inspection volume, which is on the inside surface, wherein $T_s$ is surface tangent, $N_s$ is surface normal and $N_f$ is flaw normal. There is an additional requirement to calculate angle at the flaw 116 (nominal inspection angle), also on the inside surface. These are referred to as essential parameters of a nozzle inside radius examination and are shown in FIG. 2.

The blend dimensions are translated into a three-dimensional computer model which is used for testing of the operational capability of the nozzle, pressure vessel, and blend. In fact, since the nozzle, pressure vessel, and blend are located in a radiation area, and access to the interior surface thereof is restricted during operation, the computer model is used for testing the integrity of the interior surface. To that end, a computerized testing program is used to develop a testing regime according to the computer model that specifies the procedures necessary to test the integrity of the interior surface of the nozzle, pressure vessel, and blend during operation of the nuclear facility.

Such a testing regime uses various transducer probes to determine whether there are flaws such as cracks, voids or slag build-up on the interior surface of the nozzle, pressure vessel, and blend. Since extended exposure to the radiation area in which the nozzle, pressure vessel, and blend are located is a consideration, the testing regime is configured to limit the number of testing iterations, and maximize the coverage (i.e. the amount of the interior surface area analyzed) for each iteration.

A computational model is required due to the complexity of the different nozzle geometries, in order to achieve 100% coverage of the nozzle inside radius area, which is designated as the area between bore S=0 and vessel S=Smax in FIG. 3, nozzle cross section. Normally the examination requires scanning from the vessel outer shell radius "Rvo" (vessel inner shell radius "Rvi") and from the blend outer radius "Rbo" (blend inner radius "Rbi") with several different transducer angles and skews, wherein R on the x axis is the distance from the nozzle center and Z on the y axis is the distance from the vessel center.

To illustrate, a testing regime may specify three iterations each using a differently-angled transducer probe. Each iteration will have an approximately cylindrical surface area around the nozzle, pressure vessel, and blend associated therewith where a specified transducer probe is utilized. During each iteration, the specified transducer probes are manually moved by a technician three-hundred-sixty degrees (360E) around the associated, approximately cylindrical surface areas.

The approximately cylindrical surface areas for each iteration are defined between two rings spaced around the exterior surface of the nozzle, pressure vessel, and blend. To insure complete coverage, the approximately cylindrical surface areas for the three iterations may overlap.

To further insure complete coverage, the testing regime also provides a range of skews (i.e. rotational orientations) at which the specified transducer probe for each iteration are to be oriented as they are moved around the exterior surface of the nozzle, pressure vessel, and blend.

Each of the transducer probes used during the various iterations are calibrated to excite a signal reflection as they are moved around the exterior surface of the nozzle, pressure vessel, and blend. These signal reflections correspond to flaws, the aforementioned cracks, voids or slag build-up, on the interior surface of the nozzle, pressure vessel, and blend. Upon recognition of the receipt of a signal reflection, the position of the transducer probe on the exterior surface is indicated by the technician. Conventionally, the technician performing the test indicates the location and position of the transducer probe, such as by tracing the outline of the transducer probe on the exterior surface of the nozzle, pressure vessel, and blend, or by any other suitable marking or tagging technique.

After the various iterations specified by the testing regime are completed, the positions of the flaw indications (such as traced outlines signifying the location and position of the transducer probes when the signal reflections were received) are entered into the computerized testing program. Given the angle of the transducer probe utilized, and the coordinates and skew of the transducer probe when the signal reflection was received, the computerized testing program (using the above-discussed three-dimensional computer model) is capable of mapping the position of the flaw associated with the signal reflection on the interior surface of the nozzle, pressure vessel, and blend. Once the flaw is located, the significance of the flaw can be evaluated to determine the operational capability of the vessels.

The definition of skew is shown in FIGS. 4a-d. With a 0° skew aligned with the nozzle 12 axis, beam 112 of the transducer probe 111 pointed in the direction of the blend 16 and nozzle 12 center as shown in FIG. 4a; 90° skew is with the beam 112 pointed circumferentially around the nozzle 12 in either the clockwise (+90) direction as shown in FIG. 4d or counter-clockwise (−90) direction as shown in FIG. 4b; and 180° skew is again aligned with the nozzle 12 axis but the beam 112 is pointed in the direction of the vessel shell as shown in FIG. 4c.

When an indication is recorded during an in-service examination, to accurately locate the flaw, an understanding of transducer position and location on the scan surface is imperative to position the flaw on the inside surface. To accurately measure transducer location in azimuth around the nozzle circumference, to measure the transducer radial position with respect to nozzle center and to measure the transducer skew with respect to nozzle position are time consuming and difficult. It is also difficult and time consuming to lay out a nozzle for examination because of its geometry and the multiple search units that are used for specific radial areas around the nozzle. Each search unit is used in a specific radial position and the technician needs to be able to quickly identify the different areas.

Given that the nozzle, pressure vessel, and blend may be located in a radiation area, and that a significant portion of time spent in that environment is necessarily allocated to performance of the testing regime, there is a need for a device capable of accurately and quickly measuring the location and position (i.e. the coordinates and skew) of a flaw indication marking or tag, such as a traced outline, on the exterior of the nozzle, pressure vessel, and blend. Such a device should be capable of quickly measuring both the radial position and the angular position of a flaw indication (i.e., traced outline) relative to the axis of the nozzle, and the skew of the transducer probe which provided the flaw indication (traced outline).

SUMMARY

A measurement device is provided capable of providing coordinates for a specified position on the exterior surface of a vessel, comprising: a base adapted to contact the exterior surface of the vessel; a rail extending upwardly from the base, the rail including a measurement scale; a head slidably supported by the rail; and a laser carried by the head for projecting an image on the exterior surface of the vessel. The head may include a clamping mechanism used to releasably secure the head to the rail. The base is capable of being oriented at various positions on the exterior surface of the vessel.

In certain embodiments, the base includes an angle indicator for determining the angular position of the rail. The angle indicator may be an electronic angle indicator, or in other embodiments, the angle indicator is a manual angle indicator including a level and a protractor, and is attached to the base such that, when the level is level, and the protractor, according to an indicator such as a notch provided on the base, reads ninety degrees (90), the rail is vertically oriented. When the base is repositioned on the exterior of the vessel, the angle indicator can be rotated to level the level, and the protractor, according to the notch, can be read to determine the angular position of the rail and the head supported by the rail relative to vertical.

It is further provided that when the image provided by the laser is projected on the exterior surface of the vessel, the measurement scale can be read to determine the radial position of the rail and the head supported by the rail, and the angle indicator can be read to determine the angular position of the rail and the head supported by the rail.

In certain embodiments, the laser is a cross-hair laser capable of projecting a cross-shaped image and is mounted to a degree wheel housing rotatably carried by the head. When the specified position on the exterior surface of the vessel is marked by a flaw indication (such as a traced outline of the transducer probe as it received the signal indicating the flaw), and when the degree wheel housing is rotated, the cross-shaped image projected by the cross-hair laser is rotated, and the orientation of the cross-shaped image is capable of being related to the skew of the traced outline via degree markings provided on the degree wheel housing.

A method of providing coordinates for a specified position on the exterior surface of a vessel is further provided, comprising:

placing a measurement device on the exterior surface of the vessel, the measurement device having a base, a rail extending upwardly from the base, and a head slidably supported by the rail;

projecting an image from a laser carried by the head on the exterior surface of the vessel;

centering said image projected from the laser on the specified position by orienting the base around the exterior surface of the vessel, and by adjusting the head on the rail; and determining coordinates of the specified position on the exterior surface of the vessel from the positions of the base and the head.

In certain embodiments of the method, coordinates of the specified position can be determined by reading an angle indicator associated with the base and a measurement scale included on the rail. The angle indicator provides the angular position of the rail relative to vertical and the measurement scale provides the radial position of the head supported by the rail.

Also, in certain embodiments, the specified position on the exterior of the vessel is indicated by a traced outline and the laser carried by the head is a cross-hair laser projecting a cross-shaped image; and the method includes determining the skew of the traced outline by rotating the cross-hair laser relative to the traced outline.

In certain embodiments, the cross-hair laser is mounted to a degree wheel housing rotatably carried by the head. When the degree wheel housing is rotated, the cross-shaped image projected by the cross-hair laser is rotated, and the orientation of the cross-shaped image is capable of being related to the skew of the traced outline via degree markings provided on the degree wheel housing.

DETAILED DESCRIPTION

A measurement device is configured to provide the location and position of a flaw indication on the exterior of a nozzle, a pressure vessel, and/or a blend between the nozzle and pressure vessel. More particularly, the device provides the location and position coordinates and skew of a flaw indication, such as the traced outline of a transducer probe provided on the exterior of the nozzle, pressure vessel, and/or blend (hereinafter collectively referred to as "a vessel"). The device measures both the radial position and the angular position of a traced outline relative to the axis of the nozzle, and the skew of the transducer probe which provided the traced outline.

Table 1 below summarizes representative angle and skew combinations that were determined from nozzle modeling to achieve a full coverage examination. Parameters that control the scanning area and calibration are also specified.

TABLE 1

Tip Diffraction Detection Techniques for Sample Nozzle

| Probe Angle | Probe Skew | Scan Surface | Min R | Max R | Min MP | Max MP | Max Misorientation |
|---|---|---|---|---|---|---|---|
| 60 | ±24 | Blend | 13.16 | 15.13 | 8.95 | 12.28 | 18 |
| 70 | ±(12 to 28) | Vessel | 16.24 | 21.87 | 12.59 | 17.90 | 18 |
| 50 | ±40 | Blend | 13.98 | 14.62 | 10.97 | 13.60 | 14 |

(All units are in degrees)

Probe angle is the incident angle at the surface. This is a function of the probe manufacturing process and is a fixed dimension.

Probe skew is the skew of the probe as it sits on the surface of either the blend or the vessel. For probes used from the blend surface the wedge comprising the base will have to be contoured first for the radius and then for the skew angle, which would be (±) so many degrees from 0°. This is also a function of the probe manufacturing process and is a fixed dimension. For probes used from the vessel plate the wedge is flat, and the technician is skewing the probe between the ranges specified, while scanning. This is a variable dimension and would be measured using the measurement device.

Scan Surface defines the area that the specific examination technique is to be applied from (i.e., vessel shell surface, blend surface, nozzle taper/boss). This is a variable dimension with respect to "R" position and is measured using the measurement device.

Min R and Max R are the minimum and maximum probe radial positions that will define the scan area, for each examination technique, on the outside surface. This is a variable dimension, usually from the nozzle center and can be measured using the measurement device.

Figure 1:
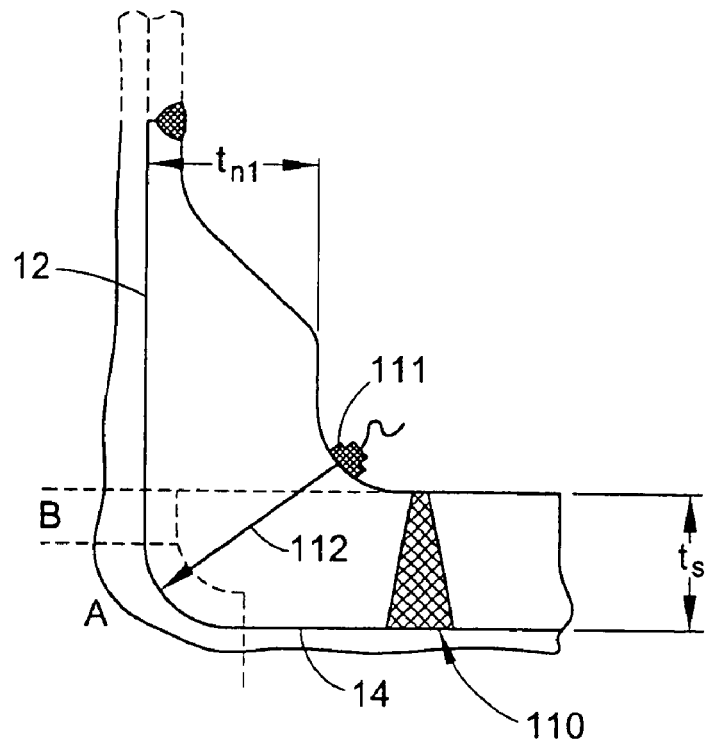
FIG. 1 is a schematic representation of a cross-section of a nozzle inside radius section.
Figure 2:
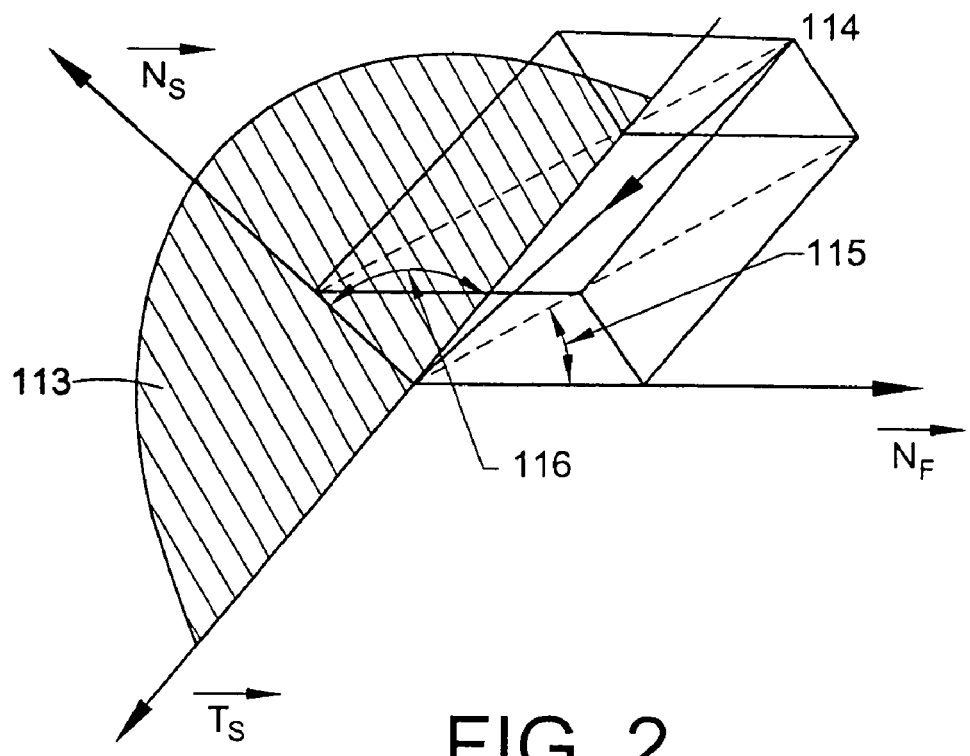
FIG. 2 is a schematic representation of the parameters of nozzle inside radius measurements.
Figure 3:
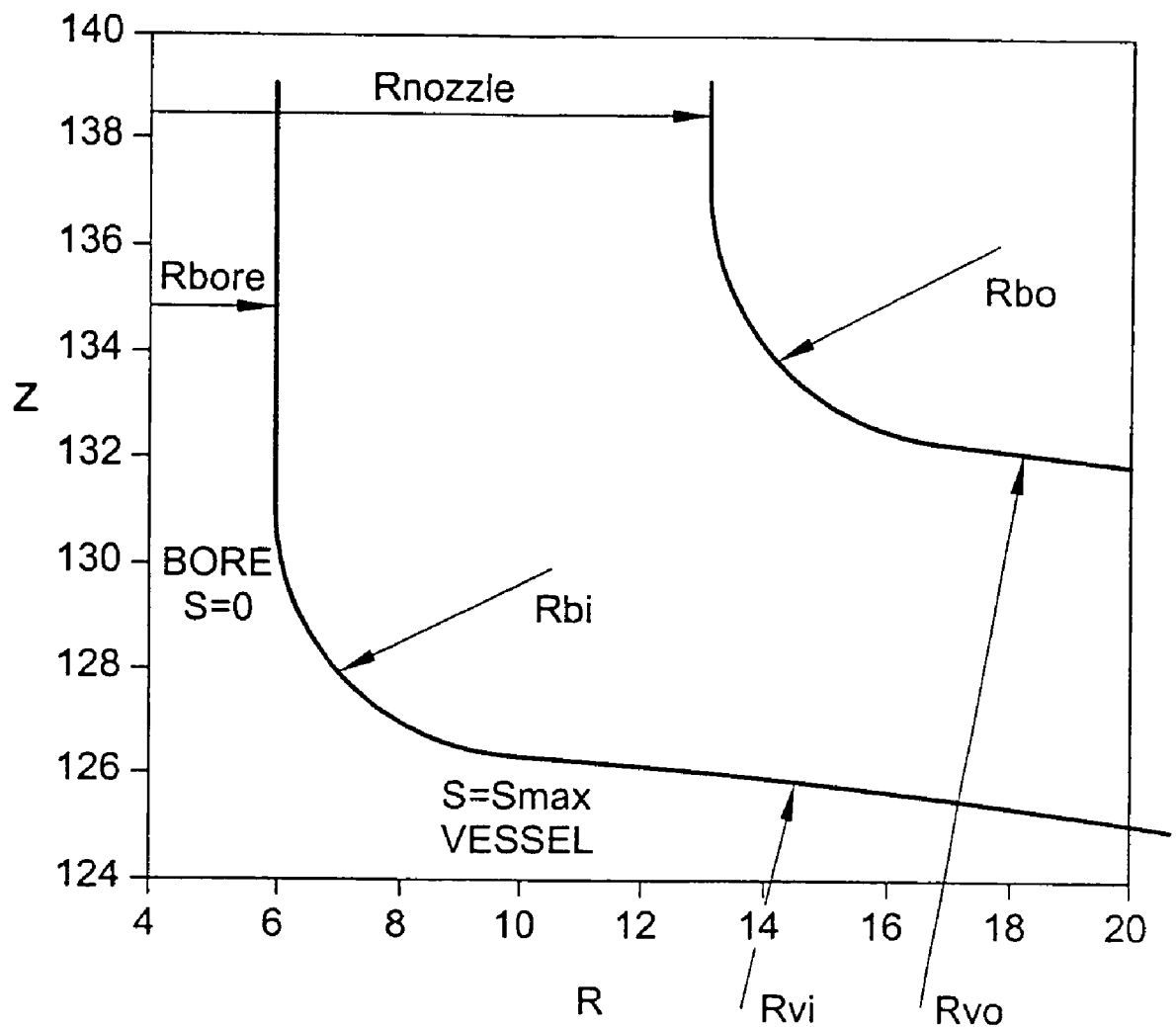
FIG. 3 is a graph of a computational model of a nozzle inside radius area.
Figure 4A:
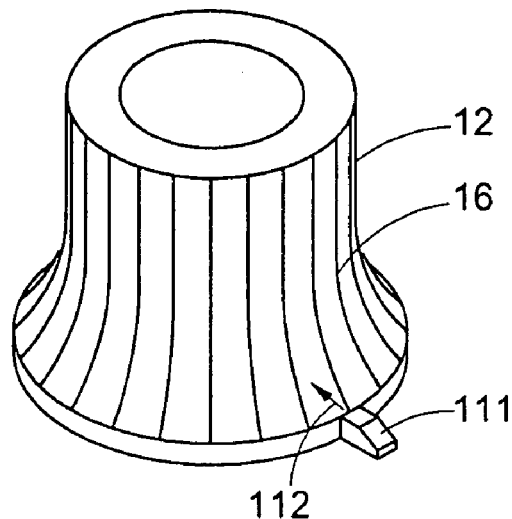
FIGS. 4*a*, 4*b*, 4*c* and 4*d* are schematic representations of transducer probe skew at a nozzle inside radius area.
Figure 4B:
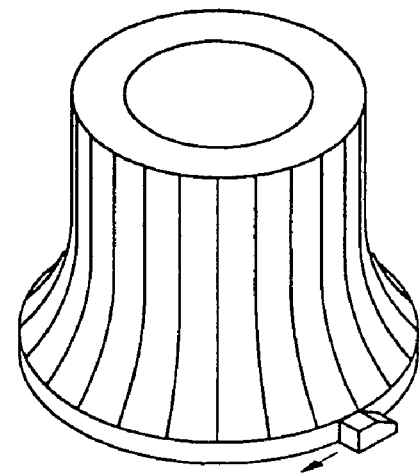
Figure 4C:
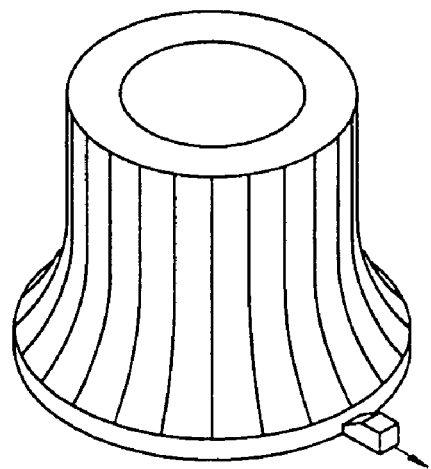
Figure 4D:
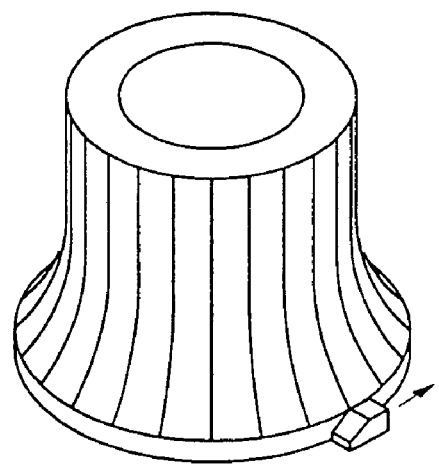
Figure 5A:
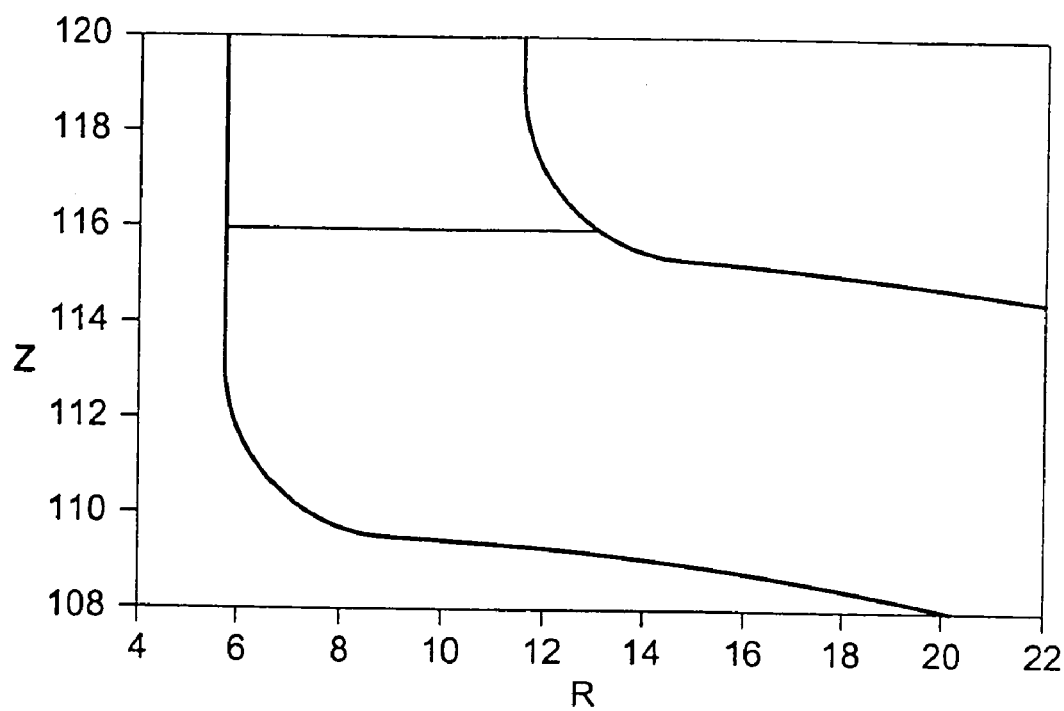
FIGS. 5*a* and 5*b* are graphs of a computational model of the examination volume of blend radius detection techniques in a nozzle inside radius area.
Figure 5B:
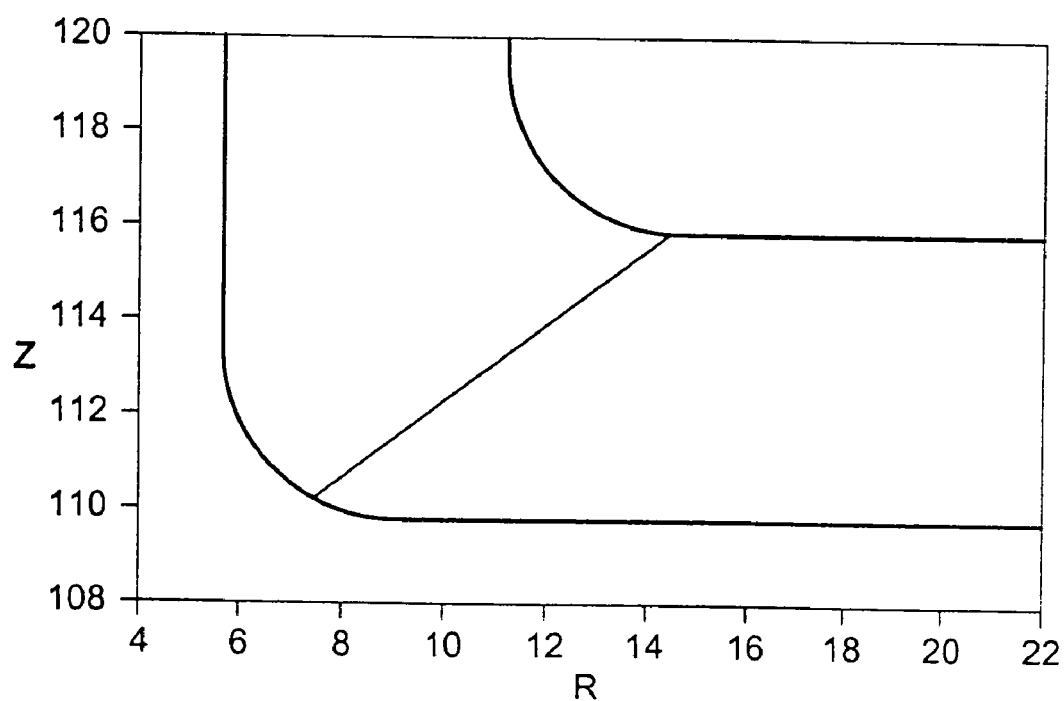
Figure 6A:
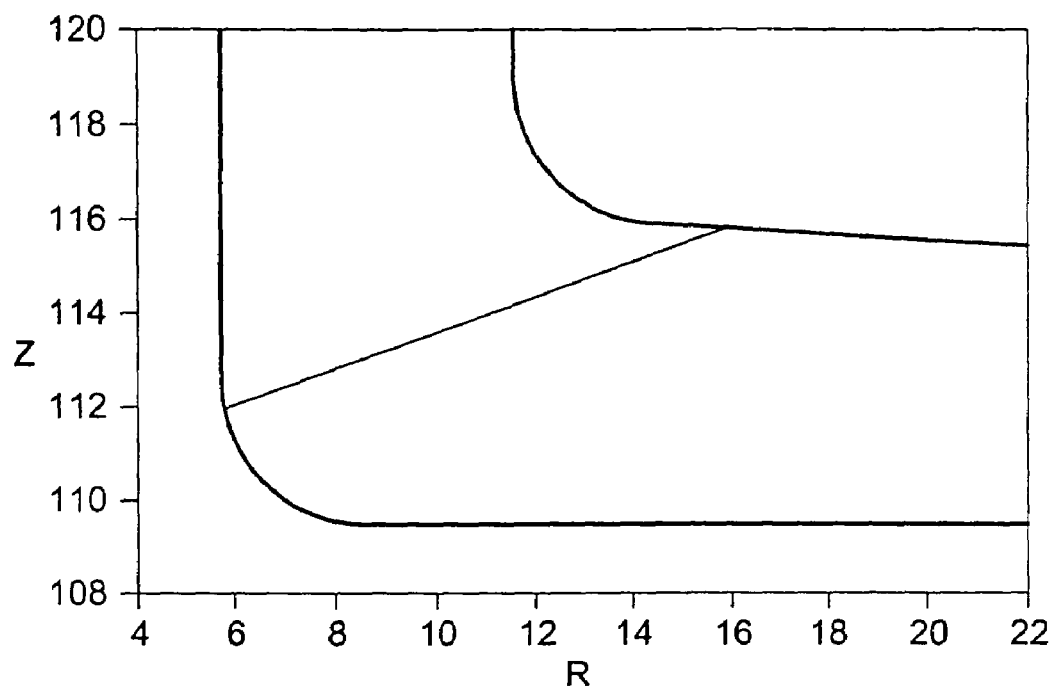
FIGS. 6*a* and 6*b* are graphs of a computational model of the examination volume of vessel radius detection techniques in a nozzle inside radius area.
Figure 6B:
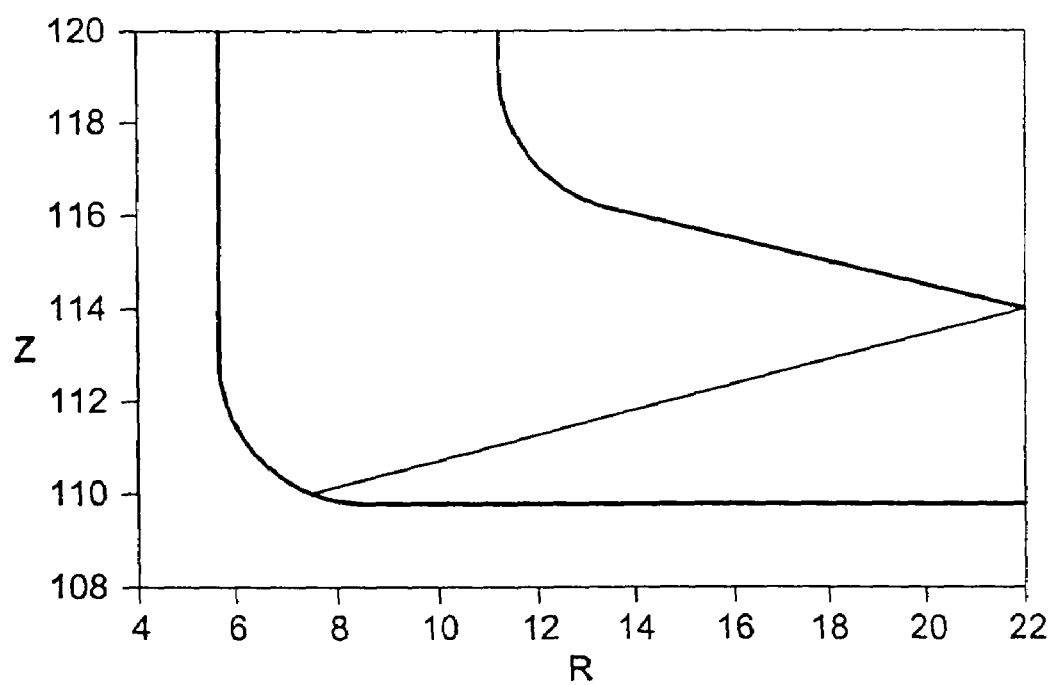

FIGS. 5a and 5b show the minimum and maximum probe radial positions and the portion of the examination volume covered by the blend radius detection technique, 60/24b, for probes scanned at the azimuth angles of 114.85° and 203.08°, respectively. FIGS. 6a and 6b show the minimum and intermediate probe radial positions and the portion of the examination volume covered by the vessel shell detection technique, 70/(12 to 28) v, for probes scanned at the azimuth angles of 209.92° and 63.12°, respectively.

Figure 8:
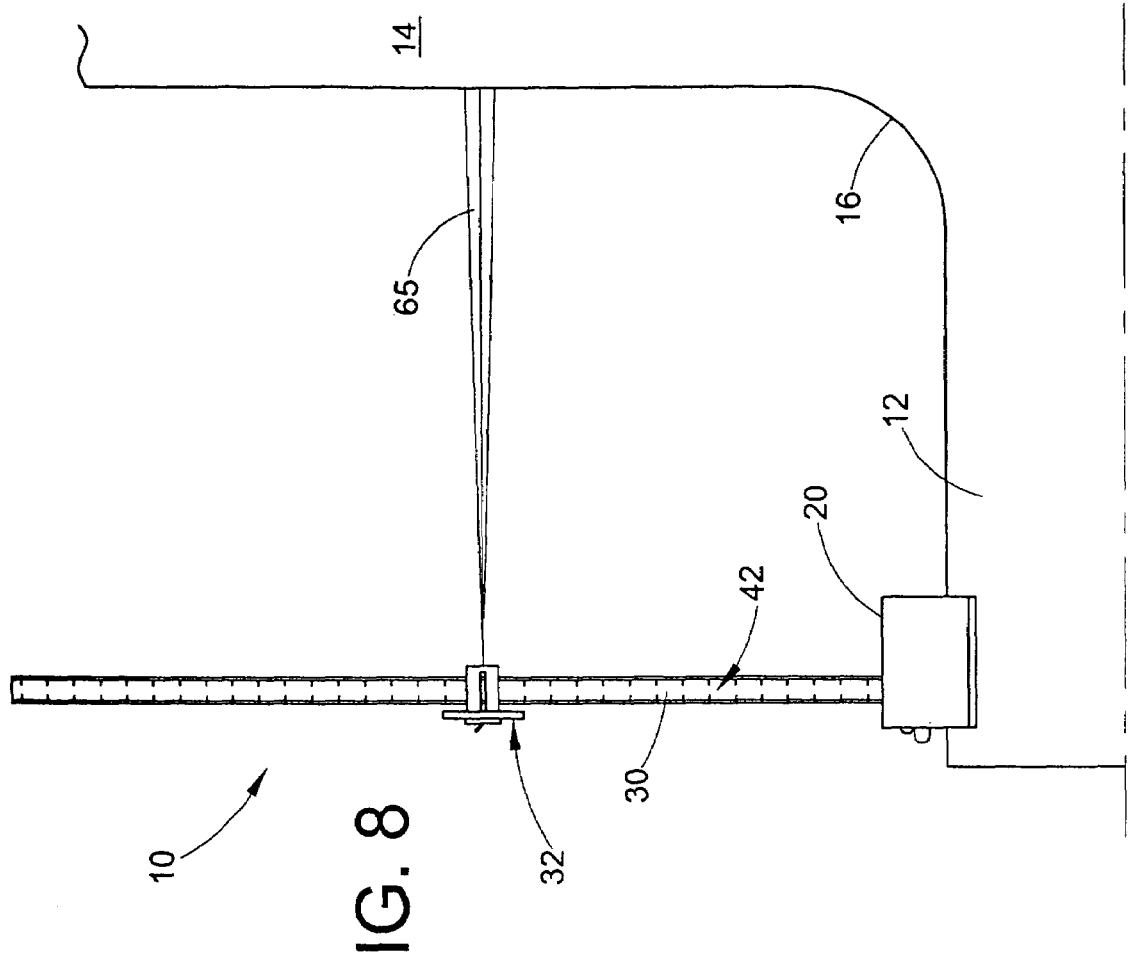
FIG. 8 is an elevational view of the measurement device positioned on the nozzle taken along the axis of the nozzle.
Figure 7:
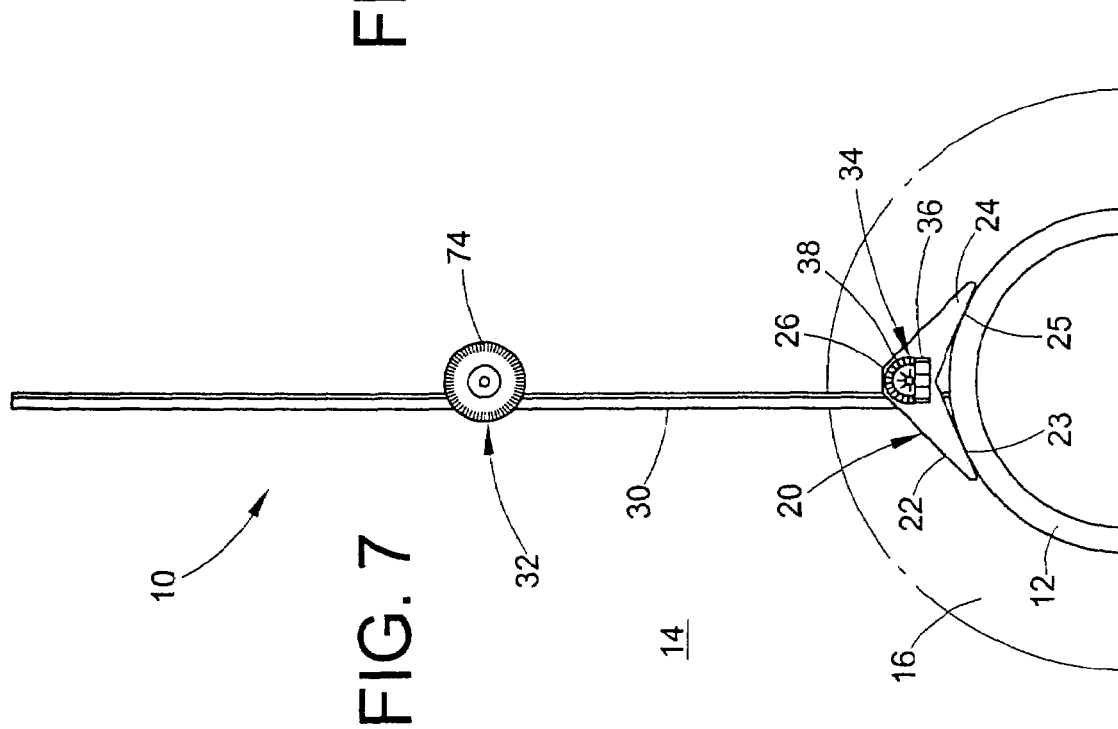
FIG. 7 is an elevational view of a measurement device positioned on a nozzle taken perpendicularly to the axis of the nozzle.

The measurement device is generally indicated by the numeral 10 in FIGS. 7 and 8. The measurement device 10 is seen positioned on a nozzle 12 perpendicularly oriented with respect to a pressure vessel 14. The nozzle 12 communicates with the interior of the pressure vessel 14 so that fluid can be transferred from the pressure vessel 14 through the nozzle 12 during operation. A blend 16 is formed where the nozzle 12 has been welded to the pressure vessel 14. Both on the interior and exterior of the nozzle 12 and pressure vessel 14, the blend 16 provides for a smooth radiused transition between the nozzle 12 and pressure vessel 14.

After a testing regime has been preformed (such as one specified by a computerized model or testing program), various transducer locations at flaw indications, such as probe outlines, may be present on the exterior surface of the nozzle 12, pressure vessel 14, and blend 16. These transducer probe outlines relate to cracks, flaws, such as voids or slag build-up, on the interior surface of the nozzle 12, pressure vessel 14, and blend 16, and have been manually traced on the exterior surface when, as discussed above, a reflective signal has been received. The coordinates and skew of the transducer probe where the reflective signal was recognized (as evidenced by the traced outline) may be used by the computerized testing program to map the location of the flaw.

Because the nozzle 12, pressure vessel 14, and blend 16 may be located in a radiation area, the measurement device 10 is configured to quickly measure the position (i.e. the coordinates and skew) of the flaw indication, e.g. the traced outline. To that end, the measurement device 10 is capable of quickly measuring both the radial position and the angular position of a traced outline relative to the axis of the nozzle, and the skew of the transducer probe which provided the traced outline.

As seen in FIGS. 7 and 8, the measurement device 10 includes a base 20, which may be adapted to "sit" on the exterior surface of the nozzle 12 and/or pressure vessel 14. That is, the base 20 is provided to contact the exterior surface of the nozzle 12 and/or pressure vessel 14, and is configured to support the remainder of the measurement device 10. Depending on whether the base 20 is used on the nozzle 12 or the pressure vessel 14, the base 20 can be configured differently.

For example, when adapted to sit on the nozzle 12, the base 20 may be V-shaped. As seen in FIG. 7, the V-shaped base 20 includes a first leg 22 with a first interfacing surface 23 and a second leg 24 with a second interfacing surface 25. The first leg 22 and second leg 24 extend outwardly at congruent angles from a body 26, such that the first interfacing surface 23 and second interfacing surface 25 are provided at an obtuse angle with respect to one another. The orientation of the first interfacing surface 23 and second interfacing surface 25 allows the V-shaped base 20 to be positioned on nozzles having cylindrical surfaces of selected diameters. When adapted to sit on the pressure vessel 14, the base 20 is ideally box-shaped. As such, the box-shaped base 20 includes a somewhat flat bottom surface (not shown) adapted to interface with the exterior surface of the pressure vessel 14. However, whether V-shaped or box-shaped, the base 20 may be magnetized so that it can be oriented at various positions on the exterior surface of the nozzle 12 and/or pressure vessel 14.

Extending upwardly from the base 20 of the measurement device 10 is a rail 30 on which a head 32 is slidably mounted. When using the V-shaped base 20, a manual angle indicator 34 can be rotatably attached to the body 26 to indicate the azimuthal position (i.e. the angular position relative to vertical) of the rail 30 and the head 32 supported by the rail 30. Furthermore, when using the box-shaped base 20, an electronic angle indicator (provided within the base 20) may be calibrated to indicate the relative angular position (according to a preselected calibration angle) of the rail 30 and the head 32 supported by the rail 30.

As seen in FIG. 7, the manual angle indicator 34 includes a level 36 and a protractor 38. The manual angle indicator 34 is mounted such that the rail 30 is vertically oriented when the level 36 is level and the protractor 38 (according to an indicator or notch provided on the base 20) reads ninety degrees (90°). When the rail 30 (and hence, the head 32) is oriented at another circumferential position around the nozzle 12, the manual angle indicator 34 can be rotated to level the level 36, and the protractor 38 (according to the aforementioned indicator or notch) can be read to determine the angle of the rail 30 relative to vertical. As a result, the manual angle indicator 34 (rotatably mounted on the base 20) is configured to measure the azimuthal position of the rail 30 and the head 32 supported by the rail 30.

As discussed above, the head 32 is slidably mounted on the rail 30. The head 32 may include a clamping mechanism 40 which is capable of releaseably securing the head 32 to the rail 30. As seen in FIG. 8, the rail 30 includes a measurement scale generally indicated by the numeral 42. Therefore, given that the diameter of the nozzle 12 and/or pressure vessel 14 are known, the head 32 can be adjusted on the rail 30 relative to the measurement scale 42 contained thereon in order to measure the radial position of the head 32 relative to the axis of the nozzle 12 and/or pressure vessel 14.

Figure 9:
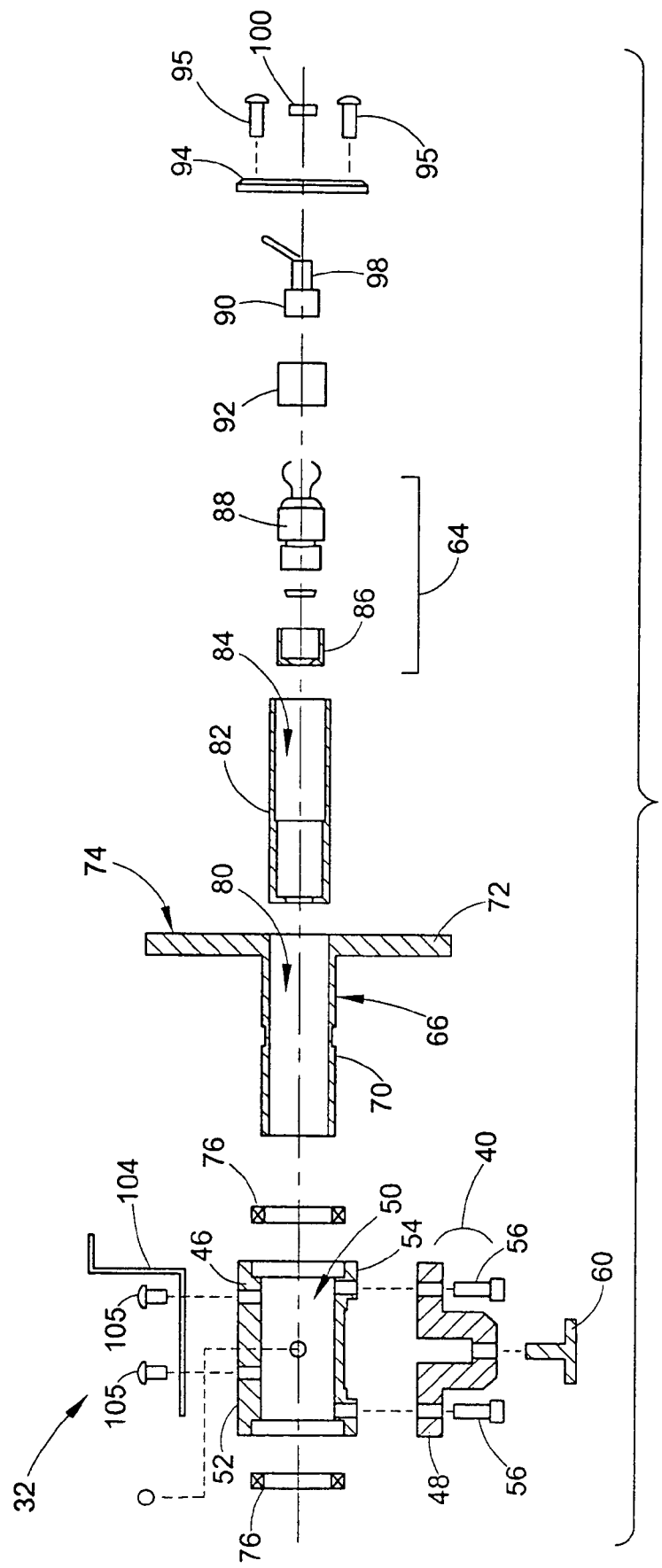
FIG. 9 is an exploded view of a head portion of the measurement device.
Figure 10:
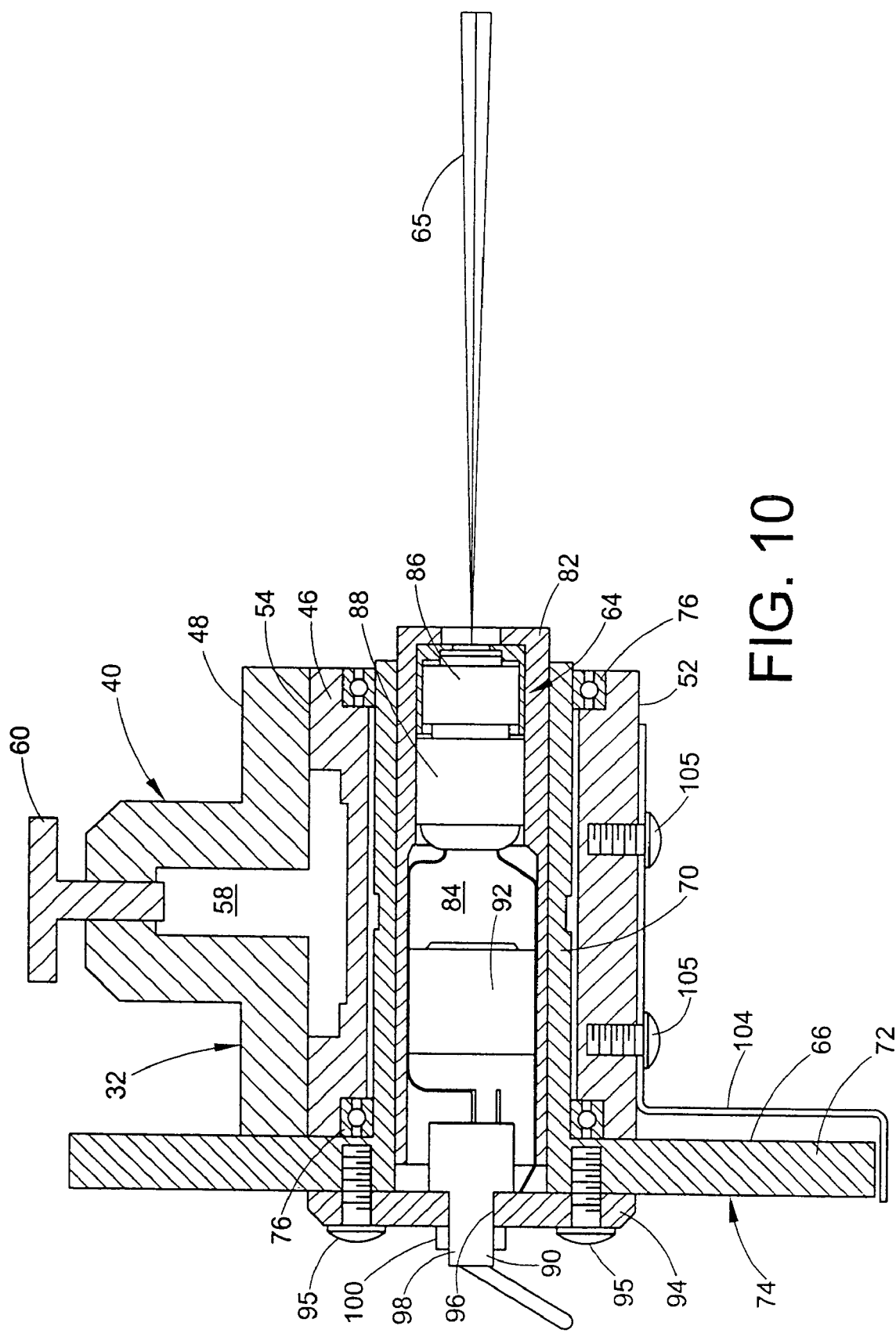
FIG. 10 is a cross-sectional view of the head portion of the measurement device.

As seen in FIGS. 9 and 10, the head 32 includes a frame 46, and the clamping mechanism 40 may be formed using a clamping member 48 attached to the frame 46. The frame 46 includes an interior cavity 50 (which, as discussed below, is adapted to receive a cross-hair laser 64), a first side 52 and a second side 54. The clamping member 48 is attached to the second side 54 using fasteners 56, and together with the second side 54 forms a cavity 58 adapted to receive the rail 30. A screw 60 may be provided through a threaded aperture (not shown) into the cavity 58 to interface with the rail 30. Once the head 32 is properly located, the screw 60 is used to clamp the head 32 in position on the rail 30.

A cross-hair laser 64 is carried by the head 32, and is used to locate the head 32 relative to the flaw indication (or traced outline) position of the transducer probe. For example, the cross-hair laser 64 may be mounted to a degree wheel housing 66 that is rotatably carried inside the interior cavity 50 of the head 32. The cross-hair laser 64 is used to project a laser beam 65 projecting an image having a cross shape on the exterior surface of the nozzle 12, pressure vessel 14, or blend 16. After adjusting the measuring device 10 so that the cross shaped image is centered on the traced outline, a technician (after reading the angle indicator 34 and measurement scale 42) can determine the coordinates of the traced outline.

The degree wheel housing 66, as discussed above, is rotatably carried in the frame 46, and is adjustable so that a technician can determine the skew of the transducer probe associated with a flaw indication (or traced outline). As seen in FIGS. 9 and 10, the degree wheel housing 66 includes a cylindrical section 70 mounted to an annulus-shaped plate 72. The cylindrical section 70 is received within the interior cavity 50, and the annulus-shaped plate 72 is provided with degree markings generally indicated by the numeral 74. As such, the annulus-shaped plate 72 could be called a degree wheel, and, as discussed below, is provided so that a technician can determine the skew of the transducer probe.

To provide for the rotation of the degree wheel housing 66, the interior cavity 50 may be notched at both ends to accommodate bearings 76. The bearings 76 interface with the cylindrical section 70, and provide for the smooth rotation of the degree wheel housing 66 relative to the frame 46.

The cylindrical section 70 includes a laser receiving cavity 80 configured to receive a laser housing 82 in which the cross-hair laser 64 is mounted. As seen in FIGS. 9 and 10, the laser housing 82 includes a mounting space 84 which may be segmented to receive the components which form the cross-hair laser 64. For example, a lens 86 (which generates the cross shaped image) and a laser-light generator 88 are positioned at one end of the mounting space 84. A switch 90 for activating and deactivating the laser-light generator 88 is positioned at the other end of the mounting space 84. A battery 92 (for powering the laser-light generator 88) is connected to the switch 90, and, as seen in FIG. 10, may be positioned adjacent the switch 90.

As seen in FIG. 10, a switch cover 94 may be attached to the annulus-shaped plate 72 using fasteners 95. The switch cover 94 includes an aperture 96, and is provided to secure the switch 90 relative to the degree wheel housing 66. For example, a threaded portion 98 of the switch 90 may be provided through the aperture 96, and a switch nut 100 may be used to secure the switch 90 to the switch cover 94.

To determine the skew of the transducer probe associated with a flaw indication, such as the traced outline of the transducer, the measurement device 10, as discussed above, is adjusted to center the cross shaped image on the traced outline. Thereafter, the degree wheel housing 66 is rotated to determine the skew. For example, the degree wheel housing 66 may be rotated until the segments of the cross shaped image (projected by the cross-hair laser 64) are perpendicular to the sides of the traced outline which these segments intersect. A reference point to measure the rotation of the degree wheel housing 66 may be provided by a pointer 104 attached to the first side 52 of the frame 46 via fasteners 105.

Therefore, to determine the skew of the transducer probe associated with a traced outline, a technician (once the cross shaped image is properly oriented relative to the traced outline) reads the degree markings 74 indicated by the pointer 104. As such, the skew of the transducer probe can be determined by orienting the cross shaped image projected by the cross-hair laser 64, and relating the orientation of the cross shaped image to degree markings 74 referenced by the pointer 104.

Although described with respect to pressure vessels, nozzles and blends as used in nuclear power plant facilities, the measurement device can be used whenever a quick, accurate identification or recordal of a location and position on a vessel, such as a pressure vessel, nozzle or blend is desired.

It will be understood that the embodiments described herein are merely exemplary and that a person skilled in the art may make many variations and modifications without departing from the spirit and scope of the invention. All such modifications and variations are intended to be included within the scope of the invention as described herein.

It should be appreciated that the present invention is not limited to the specific embodiments described above, but includes variations, modifications and equivalent embodiments defined by the following claims. Further, all embodiments disclosed are not necessarily in the alternative, as various embodiments of the invention may be combined to provide the desired result.

We claim:

1. A quantitative measurement device capable of providing coordinates in three dimensions, for a specified location and orientation on the exterior surface of a vessel, comprising:
   a base adapted to contact the exterior surface of the vessel, wherein said base is capable of being oriented at various positions on the exterior surface of the vessel;
   a rail extending from the base, the rail including a measurement scale for determining a location coordinate in a first dimension;
   an angle indicator for determining a location coordinate in a second dimension, the angular position of the rail;
   a head slidably supported by the rail;
   a laser carried by the head for projecting an image on the exterior surface of the vessel; and
   means for determining the orientation of the image in a third dimension.

2. The measurement device according to claim 1, wherein the base is magnetized.

3. The measurement device according to claim 1, wherein the angle indicator is an electronic angle indicator.

4. The measurement device according to claim 1, wherein the angle indicator is a manual angle indicator, the manual angle indicator including a level and a protractor, and being associated with the base such that, when the level is level, and the protractor, according to an indicator, reads a calibrated degree value, the rail is vertically oriented, wherein the calibrated degree value is optionally ninety degrees.

5. The measurement device according to claim 4, wherein, when the base is repositioned on the exterior of the vessel, the angle indicator can be rotated to level the level, and the protractor, according to the indicator, can be read to determine the angular position of the rail and the head supported by the rail relative to vertical.

6. The measurement device according to claim 1, wherein, when the image provided by the laser is projected on the exterior surface of the vessel, the measurement scale can be read to determine the radial position of the rail and the head supported by the rail, and the angle indicator can be read to determine the angular position of the rail and the head supported by the rail.

7. The measurement device according to claim 1, wherein the laser is a cross-hair laser capable of projecting a cross-shaped image.

8. The measurement device according to claim 7, wherein the cross-hair laser is mounted to a degree wheel housing rotatably carried by the head.

9. The measurement device according to claim 8, wherein the specified position on the exterior surface of the vessel is indicated by a traced outline, and when the degree wheel housing is rotated, the cross-shaped image projected by the cross-hair laser is rotated, and the orientation of the cross-shaped image is capable of being related to the skew of the traced outline via degree markings provided on the degree wheel housing.

10. The measurement device according to claim 1, wherein the head includes a clamping mechanism capable of releasably securing the head to the rail.

11. A method of providing three quantitative coordinates for a specified position and orientation on the exterior surface of a vessel, comprising:
    placing a measurement device on the exterior surface of the vessel, the measurement device having a base, a rail including a measurement scale extending from the base, an angle indicator for determining the angular position of the rail, and a head slidably supported by the rail;
    projecting an image from a laser carried by the head on the exterior surface of the vessel;
    centering said image projected from the laser on the specified position by orienting the base around the exterior surface of the vessel, and by adjusting the head on the rail;
    orienting said image projected from the laser about the specified position by rotating the laser relative to the head;
    determining coordinates of the specified position on the exterior surface of the vessel from the positions of the base and the head; and
    determining the coordinate of the specified orientation of the image from the orientation of the laser.

12. The method according to claim 11, wherein coordinates of the specified position can be determined by reading an angle indicator associated with the base and a measurement scale included on the rail.

13. The method according to claim 12, wherein the angle indicator provides the angular position of the rail relative to vertical and the measurement scale provides the radial position of the head supported by the rail.

14. The method according to claim 13, wherein the angle indicator is an electronic angle indicator.

15. The method according to claim 13, wherein the angle indicator is a manual angle indicator including a level and a protractor, and being associated with the base such that, when the level is level, and the protractor, according to an indicator, reads a calibrated degree value, the rail is vertically oriented, wherein the calibrated degree value is optionally ninety degrees.

16. The method according to claim 15, wherein the specified position on the exterior of the vessel is indicated by a traced outline.

17. The method according to claim 16, wherein the cross-hair laser is mounted to a degree wheel housing rotatably carried by the head.

18. The method according to claim 17, wherein, when the degree wheel housing is rotated, the cross-shaped image projected by the cross-hair laser is rotated, and the orientation of the cross-shaped image is capable of being related to the skew of the traced outline via degree markings provided on the degree wheel housing.

19. The method according to claim 16, wherein the laser carried by the head is a cross-hair laser projecting a cross-shaped image.

20. The method according to claim 19, including determining the skew of the traced outline by rotating the cross-hair laser relative to the traced outline.

* * * * *